United States Patent [19]
Lafferty et al.

[11] Patent Number: 4,817,148
[45] Date of Patent: Mar. 28, 1989

[54] SIGNAL SCRAMBLING TRANSMISSION SYSTEM

[75] Inventors: Stephen H. Lafferty, Roswell; David B. Lett, Norcross, both of Ga.

[73] Assignee: Wegener Communications, Inc., Duluth, Ga.

[21] Appl. No.: 69,712

[22] Filed: Jul. 6, 1987

[51] Int. Cl.$^4$ .............................................. H04L 9/02
[52] U.S. Cl. ........................................ 380/48; 380/9; 380/46; 380/49; 375/114; 375/115
[58] Field of Search ................... 380/46, 48, 49, 9; 375/114, 115

[56] References Cited

U.S. PATENT DOCUMENTS

| | | |
|---|---|---|
| 3,659,046 | 4/1972 | Angeleri et al. . |
| 3,694,757 | 9/1972 | Hanna, Jr. . |
| 3,854,011 | 12/1974 | Mallory et al. . |
| 3,931,473 | 1/1976 | Ferris, Jr. . |
| 3,952,162 | 4/1976 | Texier et al. . |
| 4,001,693 | 1/1977 | Stackhouse et al. . |
| 4,032,885 | 6/1977 | Roth . |
| 4,071,692 | 1/1978 | Weir et al. . |
| 4,176,247 | 11/1979 | Englund . |
| 4,278,837 | 7/1981 | Best . |
| 4,301,534 | 11/1981 | Genter . |
| 4,322,576 | 3/1982 | Miller ................................. 380/29 |
| 4,379,206 | 4/1983 | Aoki . |
| 4,383,322 | 5/1983 | Halpern et al. . |
| 4,435,826 | 3/1984 | Matsui . |
| 4,442,527 | 4/1984 | Munday ................................. 375/1 |
| 4,535,355 | 8/1985 | Arn et al. . |
| 4,550,222 | 10/1985 | Hanni et al. . |
| 4,573,171 | 2/1986 | McMahon, Jr. et al. . |
| 4,575,864 | 3/1986 | Rice, Jr. et al. . |
| 4,594,728 | 6/1986 | Niquel et al. . |
| 4,606,042 | 8/1986 | Kahn et al. ........................... 380/37 |
| 4,771,463 | 9/1988 | Beeman ................................. 380/46 |

Primary Examiner—Salvatore Cangialosi
Assistant Examiner—David Cain
Attorney, Agent, or Firm—Jones, Askew & Lunsford

[57] ABSTRACT

There is disclosed a signal scrambling transmission system in which the data is scrambled at the transmit end by logically combining the data with a pseudo random sequence generated by a ROM prior to transmission. The data is recovered at the receive end by logically combining the scrambled data with the same pseudo random sequence generated by a ROM. The ROM at the transmit end is divided into frames with a synchronization word and a frame count (index) word embedded in each frame. The synchronization word and index word are transmitted with each frame of data and are used to synchronize the ROM at the receive end with the incoming scrambled data. The transmit end ROM is divided into 32 frames each being 4,096 bits long. Each frame has a 27-bit synchronization word, a 5-bit index word, and 4,064 bits of pseudo random sequence.

7 Claims, 3 Drawing Sheets

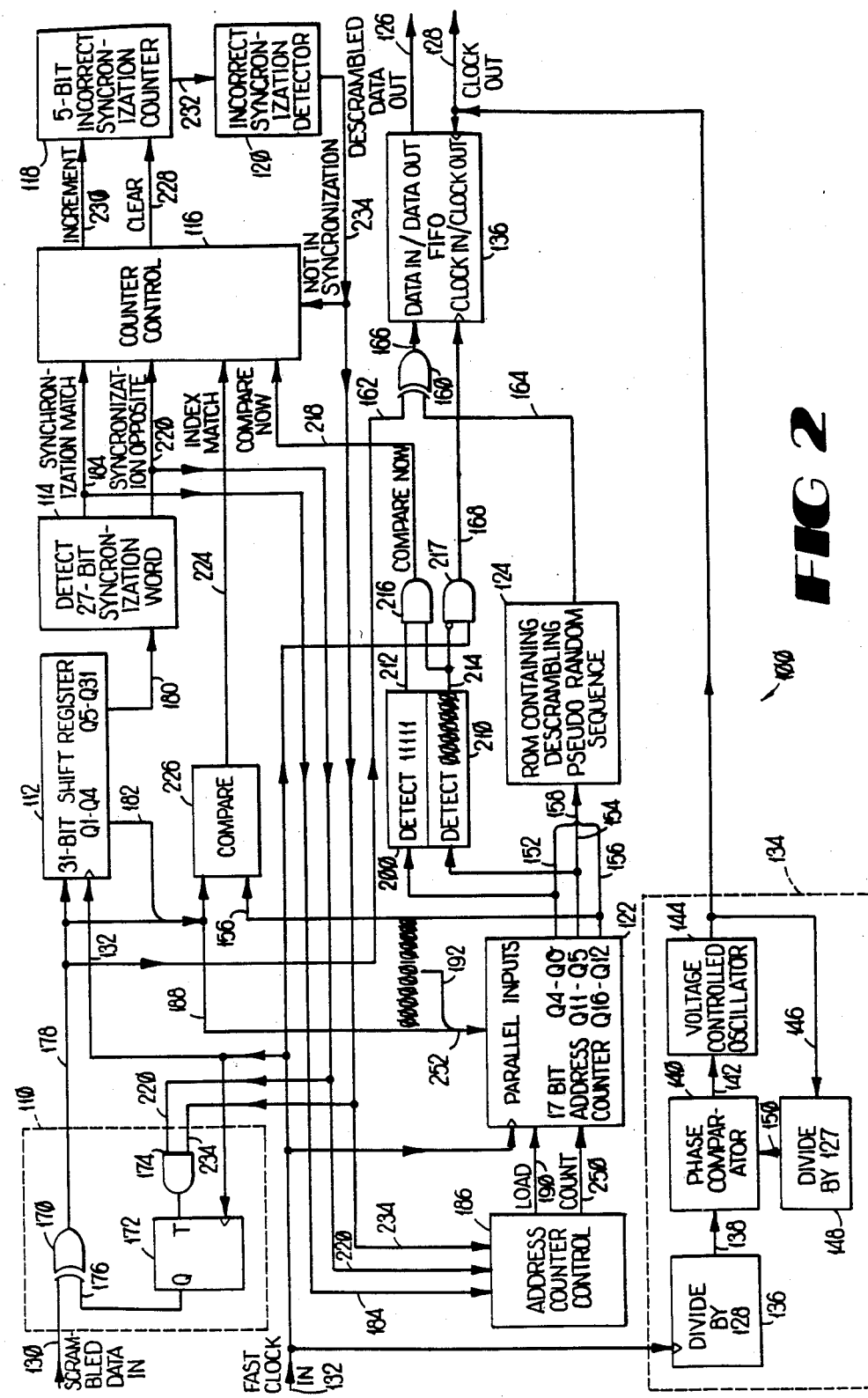

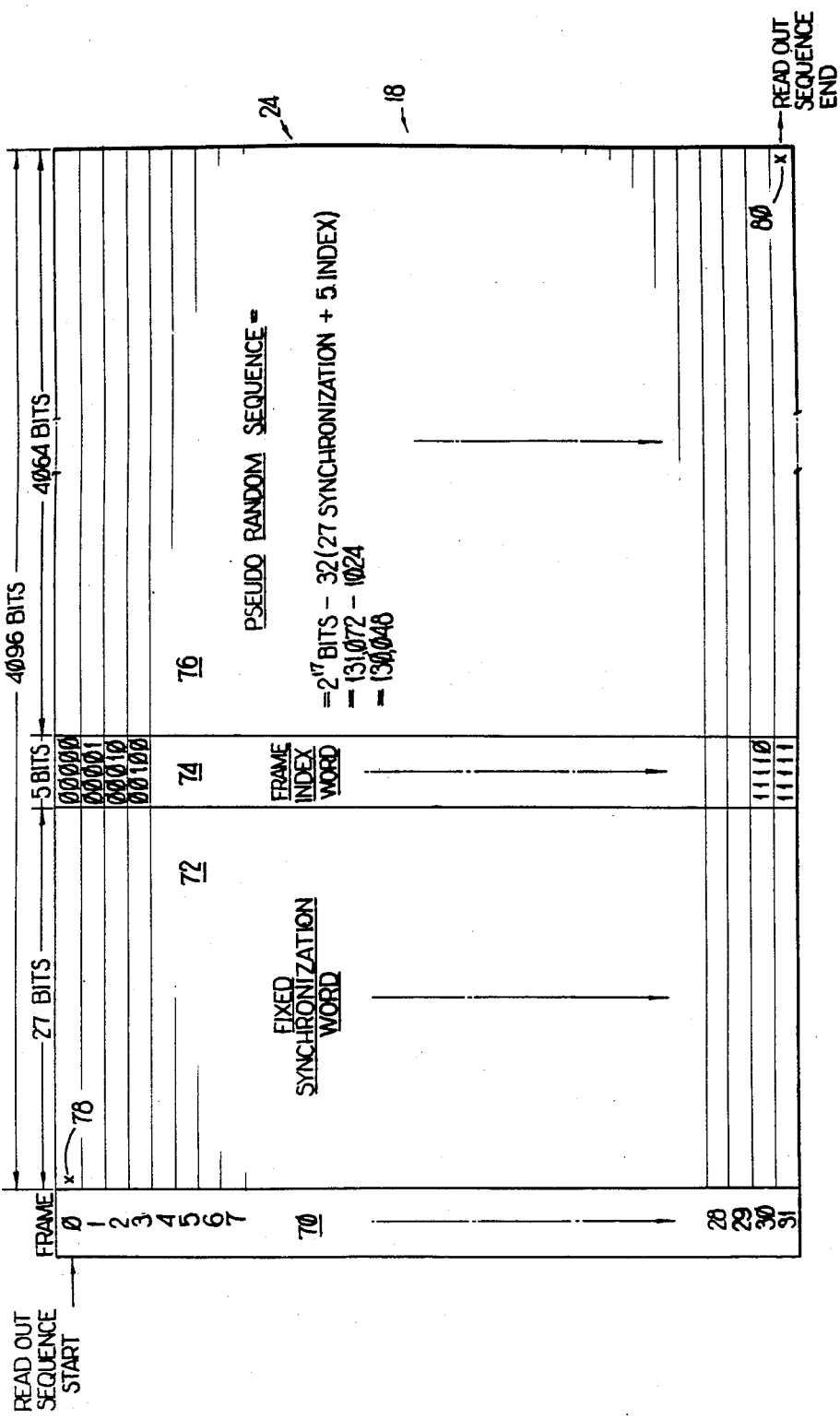

SIGNAL SCRAMBLING TRANSMISSION SYSTEM

BACKGROUND OF THE INVENTION

This invention relates generally to transmission of digital data, and more particularly concerns the transmission of digital data in scrambled fashion to facilitate clock recovery, recovery of the carrier through statistical techniques, and equalization of the number of "0"s and "1"s, thus eliminating the need for frequency response down to DC.

A common form of scrambler/descrambler data transmission system is based on a pseudo random sequence generator called a maximal length shift register. The maximal length shift register includes a shift register with exclusive OR feedback. The inputs to the exclusive OR gate feedback are connected to separate taps on the shift register. The maximal length shift register will clock through a pseudo random sequence, available at the output of the OR gate (input to shift register). The pseudo random sequence will repeat every $2^N - 1$ clock cycles, where N is the number of stages in the shift register. The particular taps used for the inputs to the exclusive OR feedback gate must be carefully chosen to insure that the sequence is random and is of maximal length.

The maximal length shift register can be used to scramble data transmissions in two basic ways. The first, and most common, system is the self-synchronizing system in which a second OR gate is interposed in the feedback loop just before the input to the shift register. The second OR gate exclusively ORs the data with the feedback signal and produces the transmitter output at the input to the shift register. If the user data is held at a binary zero, the pseudo random generator performs exactly as if no data was present and that pseudo random sequence is connected to the transmission line. If, on the other hand, the user data is held at a binary one, a different pseudo random sequence is generated at the output of the OR gate (input to the shift register), and that sequence is connected to the transmission line. In general, the effect will be to randomize the data stream. Recovery of the original data is simplified by the fact that what is transmitted is the actual input to the shift register. By feeding the scrambled data received into a similar shift register with exclusive OR connections from the same shift register taps, the shift register generates the original transmit side pseudo random sequence on the receive side. This signal is then exclusively ORed with the scrambled data to restore the original data.

The second scrambling system is a synchronization system in which two free-running pseudo random sequence generators, each consisting of a maximal length shift register, are provided both at the transmit and receive end. The pseudo random sequence at the input of the shift register is then exclusively ORed with the data at the transmit end and connected to the transmission line. In addition, a synchronization signal is generated by the maximal length shift register which is also transmitted to the receive side. At the receive side, the synchronization signal is used to synchronize the free-running maximal length shift register so that its output can then be exclusively ORed with the transmitted or scrambled data, thereby recovering the original data.

The second scrambling system has substantial advantages over the first system. Errors occurring in the transmission path of the first self synchronizing system show up immediately as the data is applied to the recovery exclusive OR gate. The transmission error propagates down the shift register past the exclusive OR taps. Consequently, one error in the transmission channel becomes N+1 separate errors in the maximal length shift register (where N equals the number of taps from the shift register). In the second system, errors in the transmission channel are only exclusively ORed with the pseudo random sequence which is unchanged, and therefore each transmission error only results in a single error in the data output.

Another difficulty in the transmission of binary data is the problem associated with demodulating binary phase shift keying data (BPSK). When BPSK data is received at a receiver and the receiver locks on to the carrier frequency and begins developing a carrier signal, there is 180° uncertainty as to the absolute phase of the carrier. The result is that the demodulated data may either be inverted or not inverted. For quadrature phase shift keying (QPSK), there is a four-way ambiguity involving inversions of pairs of bits. Other modulation schemes such as M-ary PSK and M-ary QAM also produce phase ambiguities which must be resolved at the receiver. Commonly, such ambiguity is overcome by a system called differential encoding. Before transmission, binary "1"s are encoded as a change in state, and binary "0"s are encoded as no change in state. After demodulation, transitions are decoded to binary "1"s, and bits not causing a transition are decoded to binary "0"s. This process maintains correct polarity whether or not the transmission channel is inverted because it depends only on the change of state. Differential encoding, however, possesses its own problems in that it leads to a multiplication of errors, and each error propagates into two errors since each decoded bit depends on the current bit and the past bit to establish the change of state.

SUMMARY OF THE INVENTION

It is therefore an object of the present invention to provide a signal scrambling transmission system based on logically combining a pseudo random sequence with the data prior to transmission and recovering the data with the same pseudo random sequence at the receive side by synchronizing the pseudo random sequence at the receive side with the pseudo random sequence at the transmit side of the transmission system.

It is also an object of the present invention to provide a signal scrambling transmission system in which the length of the pseudo random sequence is long enough to keep the data pattern from being periodic and producing insignificant descrete power spectral line components in the modulated RF spectrum.

It is further an object of the present invention to provide a signal scrambling transmission system in which data used for synchronizing the pseudo random sequences (overhead) is less than 2% of the transmitted data.

It is further an object of the present invention to provide a signal scrambling transmission system in which the probability of the receiver missing the first occurrence of a synchronization word in the data stream is equal in magnitude to the probability of the receiver synchronizing on the wrong, randomly occurring synchronization word in the transmitted data.

It is likewise an object of the present invention to provide a signal scrambling transmission system wherein the pseudo random sequence in the receiver will synchronize with the pseudo random sequence from the transmitter within a short, predetermined time after receipt of the scrambled data by the receiver.

It is further an object of the present invention to provide a signal scrambling transmission system which has a fast clock in the transmission link that runs slightly faster than the normal system clock. The ratio of the normal system clock and the fast clock is such that the ratio is reduced to a low integer value to simplify the clock multiplier circuitry.

It is further an object of the present invention to provide a signal scrambling transmission system wherein the scrambled data is transmitted in BPSK mode and is connected to the receiver by means of a controllable phase inverter. The phase inverter is controlled by recognition of the synchronization word or its complement in the scrambled data, thereby allowing for phase correction at the receive end of the transmission system.

It is further an object of the present invention to provide a signal scrambling transmission system wherein the receiver includes a false synchronization detector which, for each occurrence of the synchronization word, determines whether the pseudo random sequence of the receiver is still in synchronization with the transmitter's pseudo random sequence. Upon the occurrence of a predetermined number of occurrences of false synchronization, the receiver resets the pseudo random sequence to an initial position and begins looking for the next occurrence of the synchronization word in the transmitted scrambled data.

It is further an object of the present invention to provide a signal scrambling transmission system wherein the pseudo random sequence is contained in a read only memory (ROM) consisting of 32 frames. Each frame is 4,096 bits long and includes 27 bits of synchronization word, 5 bits of index word to identify the frame number, and 4,064 bits of pseudo random sequence.

The foregoing objectives of the present invention are accomplished by a signal scrambling transmission system in which the transmitter comprises an exclusive OR gate having one input connected to the data to be transmitted and having its other input connected to a pseudo random sequence generator. The pseudo random sequence generator is a ROM divided into 32 frames, each of which is 4,096 bits long, for a total of 131,072 bits. Each 4,096-bit frame is divided into a 27-bit synchronization word, a 5-bit index word for identifying the frame number, and 4,064 bits of pseudo random sequence.

The receiver for the signal scrambling transmission system includes an exclusive OR gate with one input for receiving the scrambled data and the other input connected to a pseudo random sequence generator which has the same pseudo random sequence as the pseudo random sequence generator at the transmit end. The receiver searches for the 27-bit synchronization word and 5-bit index word to identify the beginning of a frame and the particular frame in the ROM. Once the fixed synchronization word is found, the associated 5-bit index word is loaded into the upper five bits of a 17-bit address counter which addresses the first bit in the identified frame of the ROM and starts the ROM sequentially counting out its pseudo random sequence for exclusively ORing with the scrambled data.

The organization of the ROM with its 32 frames, each with a 27-bit synchronization word, a 5-bit index word, and 4,064 bits of pseudo random sequence, is selected to provide certain desirable operating characteristics for the scrambling transmission system. The 32 bits (27-bit synchronization word and 5-bit index word) represent overhead in the system, and therefore should be kept at a minimum. In the present invention, the overhead is maintained below 2%, and preferably is 0.8% which is the ratio of the overhead (32 bits of synchronization and index words) to the total frame length of 4,096 bits. The synchronization word length of 27 bits is chosen so that the chance of the detection system missing the first occurrence of the synchronization word based on an established transmission error rate is approximately equal in magnitude to the chance of the detection system locking on the random coincidental occurrence of the 27-bit synchronization word in the scrambled data.

The ROM is divided into 32 frames so that the synchronization word appears 32 times during the complete cycle through the ROM. Thus, at low data rates of 56 kilobits per second, for example, the time between synchronization words is less than 100 milliseconds, and is preferably about 73 milliseconds, which is equal to the number of bits in a frame (4,096 bits) divided by the data rate.

Because it is necessary to insert the synchronization word and index word at the beginning of each frame of data, the data has to be transmitted slightly faster than the data is processed at the transmit end. The ratio between the normal system clock and the fast clock is set at the ratio of the length of the pseudo random sequence as compared to the entire length of the frame for a ratio of 4,064 to 4,096, which reduces to 127/128. By having the ratio of pseudo random sequence to frame length reduced to a fraction having integer values of less than 200, the clock multiplier circuit which uses a phase lock loop will only have to work down to frequencies which are 128 times less than the normal clock frequency, or about 400 hertz for a low bit rate of 56 kilobits per second. The lower limit on the frequency in the phase lock loop makes the design less difficult.

Because the 27-bit synchronization word is fixed and therefore known, detection of the synchronization word for synchronizing the pseudo random sequence with the incoming scrambled data can also provide a basis for determining the existance and nature of any phase ambiguity that may have resulted during transmission. For example, the receiver of the present invention can determine whether data transmitted in BPSK mode is inverted or not inverted and can invert the phase as required if the complement of the synchronization word is detected in the scrambled data.

Other objects and advantages of the present invention will become apparent upon reading the following detailed description and upon reference to the drawings.

BRIEF DESCRIPTION OF THE DRAWINGS

FIG. 2 is a schematic diagram of the receiver of the signal scrambling transmission system of the present invention; and FIG. 3 is a diagram showing the organization in the ROM of the pseudo random sequence, the fixed synchronization word, and the frame index word.

DETAILED DESCRIPTION

Figure 1:
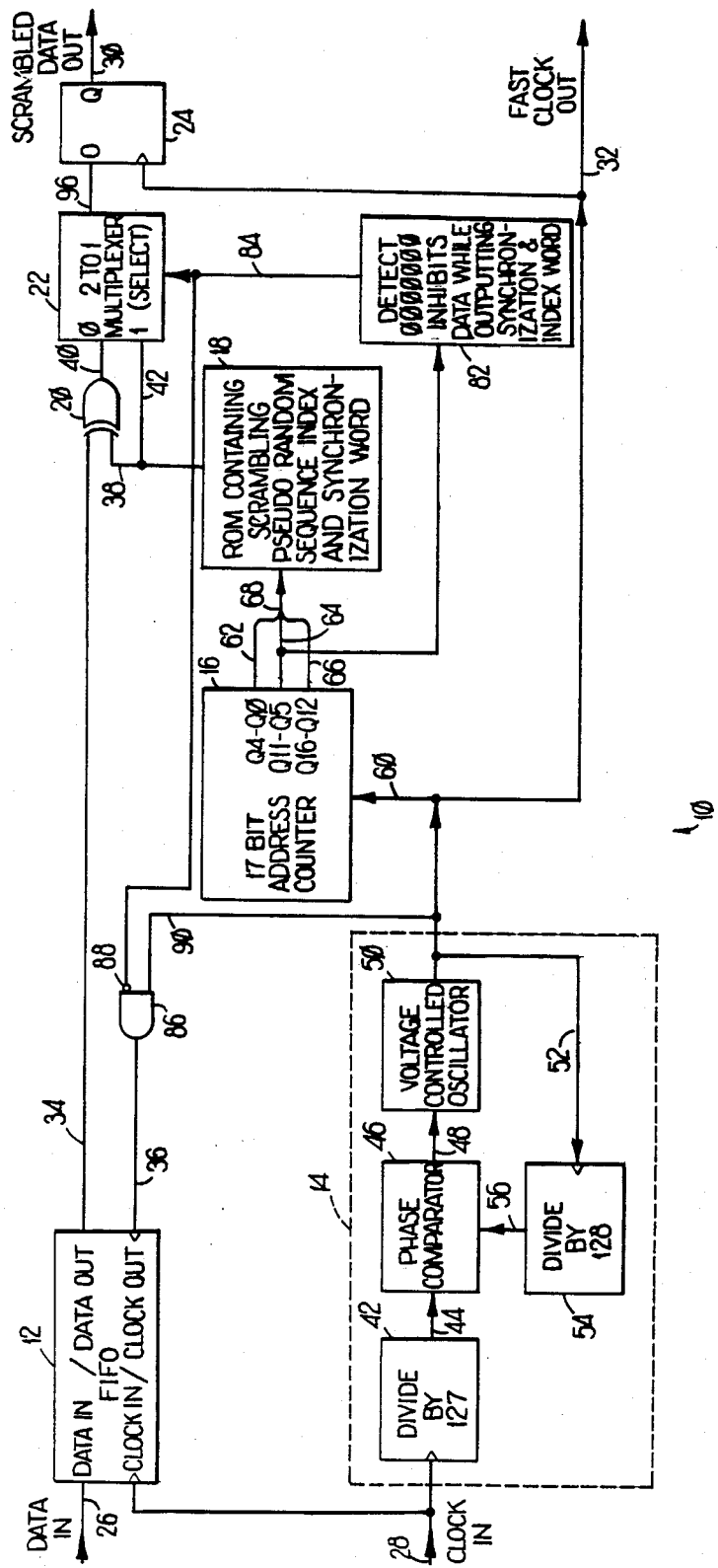
FIG. 1 is a schematic diagram showing the transmitter of the signal scrambling transmission system of the present invention.

While the invention will be described in connection with a preferred embodiment, it will be understood that we do not intend to limit the invention to that embodiment. On the contrary, we intend to cover all alternatives, modifications, and equivalents as may be included within the spirit and scope of the invention as defined by the appended claims.

Turning to FIG. 1, there is shown a transmitter 10 of the signal scrambling transmission system of the present invention. The transmitter 10 comprises data holding means 12, clock multiplier 14, address counter 16, a pseudo random sequence generator in the form of a ROM 18, an exclusive OR gate 20, and a multiplexer 22.

Data is fed to the transmitter 10 on data input line 26, and a normal system clock signal is provided on input 28 of the transmitter. After scrambling, the digital data is connected to a transmission line (not shown) via output line 30, and a fast clock signal is connected to the transmission line via output 32.

The system clock signal on line 28 is multiplied by clock multiplier circuit 14 to produce the fast clock signal which has a frequency of 128/127 times the frequency of the normal clock signal. The frequency of the fast clock is established at 128/127 times the slow clock to accommodate the transmission of synchronizing data to the receiver. The clock multiplier circuit 14 is essentially conventional and uses a phase lock loop and a voltage controlled oscillator 50 to produce the fast clock on line 32. Particularly, the frequency of the normal system clock signal on line 28 is divided by an integer value of 127 by divide circuit 42. The output on line 44 is connected to the phase comparator circuit 46 which has an output 48 connected to the voltage controlled oscillator 50. The output of the voltage controlled oscillator 50 is fed back via feedback line 52 to a second divide circuit 54 which divides the frequency of the feedback signal on line 52 by an integer value of 128 and produces an output on line 56. The phase comparator compares the frequency of the signal on line 56 to the frequency of the signal on line 44 and produces a control voltage on line 48 which controls the frequency of the oscillator 50 thereby assuring that the fast clock on line 32 runs at a frequency of 128/127 of the normal system clock on line 28.

The fast clock signal on line 32 is connected via input 60 to the 17-bit address counter 16 which serves to generate an address count Q0 through Q16 on output lines 62, 64, and 66. Address output line 62 is in fact five separate lines identifying address bits Q0 through Q4. Likewise, line 64 is in fact seven separate lines representing address bits Q5 through Q11, and output line 66 is in fact five separate lines representing address bits Q12 through Q16. The 17 address lines (Q0 through Q16) are collectively identified as line 68 which is in fact 17 separate lines connected to 17 address inputs of ROM 18. The address on lines 68 discretely identifies each of 131,072 bits of data contained in the ROM 18.

Turning to FIG. 3, there is shown schematically the organization of the memory of the ROM 18, which includes 32 frames 70 numbered 0 through 31. Each frame is 4,096 bits long. The 4,096 bits include a 27-bit fixed synchronization word 72, a 5-bit index word 74 for identifying the frame count, and 4,064 bits of pseudo random sequence 76. When the address count on lines 68 (FIG. 1) is at "0", the ROM 18 reads out the first bit of 78 of the first frame onto its output 38. As the address count is incremented by the fast clock on input line 60 of the address counter 16, the ROM 18 sequentially reads out each of the 131,072 bits shown in FIG. 3, proceeding left to right and top to bottom until the last bit 80 has been read out onto output line 38.

In operation, data to be processed is clocked into data holding means 12, which is a first-in, first-out (FIFO) memory by means of the normal clock signal on line 28. The data is clocked out of the FIFO memory 12 onto line 34 by means of an intermittent fast clock signal on line 36. The intermittent fast clock signal on line 36 runs at the rate of the fast clock on line 90 (and 32) until the beginning of each frame (detector output 84 is a logic "1") at which time it is disabled and no data is clocked onto line 34. The beginning of each frame is identified the seven address bits Q5 through Q11 on line 64. When bits Q5 through Q11 of the address count are all "0"s that indicates the end of one frame of pseudo random sequence and beginning of the synchronization word of the next frame. Consequently, at the beginning of each frame (Q5 through Q11 are "0"s), the detect circuit 82 produces an output on line 84 which is connected to multiplexer 22 to select input 42 so that the synchronization word and index word at the beginning of the frame are connected to output 96, through register 24, and onto output line 30 for transmission. At the same time, the detect circuit output on line 84 is connected via inverting input 88 of AND gate 86 to disable the AND gate 86 so that the fast clock signal on input 90 is not connected through the AND gate 86 to the output 36, and data is ot clocked out of the FIFO 12 by the intermittant fast clock.

The clock signal on line 32 is also connected to input 60 of the master counter 16, which begins counting the address onto combined output lines 68. As long as the count on lines 64 (Q5 through Q11) does not equal "0" (the beginning of a frame), each fast clock pulse clocks data out of FIFO memory 12 onto line 34. The data on line 34 is connected to one input of exclusive OR gate 20, and the other input 38 of exclusive OR gate 20 is the output of the ROM 18. The exclusive OR gate 20 exclusively ORs the data on line 34 and the pseudo random sequence on line 38 as both are delivered to the exclusive OR gate inputs in timed relationship. The output of exclusive OR gate 20 on line 40 is the scrambled data. Because the detector signal on line 84 is a logic "0", input 40 of the multiplexer 22 is selected, and the scrambled data is connected through the multiplexer 22 to output 96 and to register 24. The scrambled data in register 24 is clocked onto output line 30 by the fast clock on line 32. The scramble data is then modulated in any of a number of known manners for transmission.

Once the address count reaches all "0"s on lines 64 (bits Q5 through Q11), the detect circuit 82 provides an output on line 84 which disables the fast clock count on line 90 to the FIFO memory 12 via line 36. At the same time, the detector signal on line 84 selects the input 42 of multiplexer 22 instead of the input 40. Consequently, for the next 32 counts on the counter 16, the ROM 18 reads out the 27-bit synchronization word followed by the 5-bit index word. The synchronization word and the index word appear at output 96 of multiplexer 22 and are then gated onto the transmission output 30 by means of the output register 24 under the control of the fast clock on line 32.

Once the 32 bits of synchronization word and index word have been multiplexed to the output 30 and the counter 16 has toggled all bits Q0 through Q4, the next count toggles bit Q5 which causes the detector 82 to change its output to a logic "0". The logic "0" at the output 84 of the detector 82 inhibits input 42 of multiplexer 22 and selects input 40 of multiplexer 22 so that the data is again clocked onto line 34 and is again exclusively ORed with the pseudo random sequence found in the frame following the synchronization word and the index word of the ROM 18.

Turning to FIG. 2, there is shown a receiver 100 for the signal scrambling transmission system of the present invention. The receiver 100 has scrambled data input 130 which is connected via a transmission medium (not shown) to the scrambled data output 30 of the transmitter 10 in FIG. 1. Likewise, the receiver 100 has fast clock input 132 which is connected to fast clock output 32 of transmitter 10 via the transmission medium. The receiver 100 descrambles the scrambled data on input 130 and thereby recovers the original data on line 126 and the normal system clock on line 128.

The receiver comprises a controllable phase inverter 110, a holding shift register 112, a synchronization word detector 114, a synchronization counter control 116, incorrect synchronization counter 118, incorrect synchronization detector 120, address counter 122, address counter control 186, pseudo random sequence generator 124, clock recovery circuit 134, and an output holding means 136.

The receiver 100 receives the fast clock signal on line 132 and reproduces the original normal clock signal on line 128 by means of clock recovery circuit 134. The clock recovery circuit 134 includes a divider circuit 136 which divides the fast clock frequency by 128 to produce a divided signal on line 138. The divided signal on line 138 is connected to phase comparator 140 which produces a control voltage on line 142 which control voltage is in turn connected to a voltage controlled oscillator 144. The output 128 of the voltage controlled oscillator, which is the normal clock signal, is fed back via line 146 to divider 148. Divider 146 divides the frequency at the output of the voltage controlled oscillator by 127 to produce an output on line 150. The phase comparator compares the frequency of the divided signal on line 138 and the frequency of the signal on line 150 to regulate the control voltage on line 142. The regulated control voltage controls the frequency of the voltage controlled oscillator 144 to produce the normal clock signal on line 128 (and 146) which is 127/128 times the frequency of the fast clock on line 132.

The fast clock signal on line 132 is connected to address counter 122 and increments the address count Q0 through Q16 at outputs 152, 154, and 156. Output 152 is in fact five separate outputs for the least significant bits (Q0 through Q4) of the address count. Likewise, line 154 is seven lines for the next bits in the address count, bits Q5 through Q11, and line 156 is actually five lines for the most significant five bits of the address count, bits Q12 through Q16. Line 158 schematically represents all 17 lines of the address count that are connected to the ROM 124 to select each discrete bit of 131,072 bits from the data contained in the ROM. The ROM 124 is organized in the same fashion as the ROM 18 shown in FIG. 3. The ROM 124 contains exactly the same pseudo random sequence of bits 76 as that contained in the ROM 18. The locations for the fixed synchronization word 72 and for the index bits 74, however, are not used in the descrambling process and, therefore, information in those locations is of no significance.

The basic descrambling of the scrambled data occurs at exclusive OR gate 160 which has inputs 162 and 164. The scrambled data is delivered to the exclusive OR gate 160 on input 162, and the pseudo random sequence is connected to the exclusive OR gate 160 on input 164. By exclusively ORing the scrambled data with the same pseudo random sequence that was used in scrambling the data, the original data is then recovered at output 166 of the OR gate 160. The recovered data on line 166 is clocked into the FIFO memory 136 by means of an intermittent fast clock signal on line 168. The intermittent fast clock signal on line 168 is inhibited by AND gate 217 while the synchronization word and index word are being received. The data on line 166 is collected in the FIFO memory 136, and then clocked out onto output line 26 by means of a normal clock on line 128.

In operation, the scrambled data received on line 130 is connected to controllable phase inverter 110, which comprises an exclusive OR gate 170, flip-flop 172, and AND gate 174. As previously discussed, the scrambled data on line 130 is generally transmitted in BPSK format on the transmission media. Of course, other known formats such as QPSK, M-ary PSK, and M-ary QAM may be used. With BPSK for example there exists the possibility that the scrambled data received may be 180° out of phase with the scrambled data as sent. Therefore, it may be necessary, in order to recover the actual data, to invert the scrambled data as received before it is descrambled. As long as input 176 to exclusive OR gate 170 remains a logic "0", the scrambled data on line 130 appears in its noninverted form on output 178. Alternatively, when the input 176 becomes a logic "1", the data on output 178 is the complement of the scrambled data received on line 130. The control over the phase inverter will be described in greater detail below.

The scrambled data on line 178 (assuming the data is the noninverted data) is connected to the 31-bit shift register 112. The fast clock signal on line 132 shifts the serial data on line 178 into the shift register on each fast clock pulse. The most significant bits Q5 through Q31 appear at multiple output lines 180. The four lesser significant bits Q1 through Q4 appear at multiple output lines 182, and the next bit Q0, which is the least significant bit, appears at the input 178 of register 112. At the precise moment when the 32 bits of scrambled data have been collected, 31 bits in the shift register and one bit at its input, the 27 most significant bits Q5 through Q31, are compared to the known fixed synchronization word by means of detector 114. If the 27 most significant bits in the shift register at any point in time match the fixed synchronization word, a synchronization signal appears on output line 184 indicating a synchronization word match.

Upon the occurance of a synchronization word match, the synchronization signal on line 184 is connected to the address counter control 186, which, if all other conditions are met, produces a load signal on control line 190 and loads the address counter 122 with the five least significant bits on multiple lines 188 (bits Q1 through Q4 on line 182 of the shift register and the next bit Q0 on line 178) and with the initial fixed count shown on line 192. The bits Q0 through Q4 of the scrambled data (lines 188) become the most significant bits Q12 through Q16 of the address count on lines 156. As can be seen, the bit Q5 of the fixed count on line 192 is set to logic "1", while the rest of the bits Q0 through Q11 are set at logic "0"s. That fixed count on line 192 represents the first bit of the pseudo random sequence of any particular frame. Therefore, the output address on lines 158 to the ROM 124 selects an appropriate frame depending on the value of the index word bits Q12 through Q16 of the address on lines 156, and selects the first bit of the 4,064 bits of pseudo random sequence in that frame. As the address counts up, the ROM 124 produces the pseudo random sequence on line 164 for descrambling the data signal on line 162 as previously described in connection with the exclusive OR gate 160.

At the time the synchronization signal appears on line 184 and the count is established in the address counter 122, the receiver is said to have initially synchronized. If there were no errors in the received scrambled data and if the synchronization word did not appear by coincidence in the received scrambled data, the receiver will have synchronized on the first occurrence of the 27-bit synchronization word. Once the receiver is synchronized, the address counter 122 continues to count in response to the fast clock signal. When the address count for bits Q0 through Q4 is all "1"s (lines 152) and the address count for bits Q5 through Q11 is all "0"s (lines 154), the address has reached a point where the last 32 bits received by the register 112 should be the next synchronization word and index word, and detectors 200 and 210 both produce logic "1"s on their respective outputs 212 and 214. The logic "1" on line 214 is connected to AND gate 217 and inhibits the intermittent clock signal on line 168 so that data on line 166 is not gated into the FIFO memory 136 during the time that the synchronization word and the index word are being received on line 178 (and 162). In addition, the logic "1" outputs on lines 212 and 214 are combined by AND gate 216 to produce a compare now signal on output line 218.

The compare now signal on line 218 is connected to the counter control 116 which checks for the existence of synchronization match signal on line 184 and an index match signal on line 224. The index word match signal on line 224 results from comparator 226, which compares the index word bits Q0 through Q4 of the scrambled data on lines 178 and 182 with the index count Q12 through Q16 on line 156 of the address counter 122. If the conditions at the counter control 116 are met, namely a synchronization word match and an index word match, the counter control 116 produces a clear signal on clear output 228 which clears the incorrect synchronization counter 118 to a zero count at its output 232. As long as the counter 118 remains cleared, the incorrect synchronization detector 120 does not produce a not in synchronization signal output on line 234 indicating that the receiver 100 is synchronized. The absence of a not in synchronization signal is delivered via line 234 to address counter control 186 which in turn produces a count signal on output 250 and causes the address counter 122 to continue counting with the occurance of each fast clock pulse.

If, on the other hand after initial synchronization, the synchronization word does not match or the index word does not match at counter control 116, there is produced a signal on output 230 which increments the counter 118. The counter 118 is connected via an output 232 to a incorrect synchronization detector 120 which is preselected for a maximum number of incorrect synchronization counts. Once the maximum count is reached in counter 120, the not in synchronization signal appears on line 234 indicating that the receiver is not in synchronization because the synchronization word did not match or the index word did not match for the requisite number of times.

The not in synchronization signal on line 234 is connected to and clears the counter control 116. The not in synchronization signal on line 234 is also connected to the address counter control 186. If the synchronization word match signal exists on line 184, the address counter control 186 produces a load signal on line 190 and causes the address counter 122 to be reloaded with the count on lines 188 (Q0 through Q4 of the scrambled data) and the fixed count on line 192.

If, when the not in synchronization signal appears on line 234, the detector 114 detects the synchronization opposite word, a synchronization opposite signal is produced on line 220. The synchronization opposite signal on line 220 also causes the address counter control 186 to produce a load signal on line 190 which reloads the count on lines 188 and 192 into the address counter 122, In addition, the synchronization opposite signal also inverts the scrambled data on line 130. When the synchronization opposite signal on line 220 is a logic "1" and the not in synchronization signal on line and the 234 is a logic "1", AND gate 174 sets flip-flop 172 upon the appearance of the next fast clock pulse. With flip-flop 172 set, a logic "1" appears on line 176 and causes exclusive OR gate 170 to invert the scrambled data received at its input 130. At the occurrence of the next clock pulse and at the occurrence of the next compare now signal on line 218, the counter control 116 will again check conditions of the synchronization word detection and the index word detection and determine whether or not the synchronization of the ROM is appropriate.

Returning to FIG. 3, the organization of the ROM 18 in the transmitter is important to the performance of the signal scrambling transmission system of the present invention. It should be appreciated that the 32 bits of fixed synchronization word and frame index word represent data transmission overhead, and must be kept to a minimum to conserve transmission bandwidth. Also, the synchronization word and frame index word must appear frequently enough within the scrambled data in order to offer a number of opportunities for synchronization even at relatively low data rates. In that regard, by using 32 bits of a 4,096-bit frame, the overhead is 0.8% (32 divided by 4,096). It is desirable to maintain the overhead on most digital data transmission systems to less than 2%. Therefore, the 32-bit synchronization word and index word for each 4,096-bit frame falls well within the desired design goal for minimizing overhead. On the other hand, it is important that synchronization occur within a short period of time. At low data rates of 56 kilobits per second for example, it is desirable that the receiver synchronize in less than 100 milliseconds. In that connection, the synchronization word appears once every 4,096 bits, resulting in a synchronization time of 73 milliseconds (4,096 divided by 56 kilobits per second) Consequently, the judicious selection of the number of bits of overhead versus the number of bits of pseudo random sequence in each frame achieves the twin goals of low overhead and rapid synchronization.

Another important consideration in determining the length of the fixed synchronization word is equalizing the chance of failing to synchronize because of errors in the data transmission versus the chance of synchronizing on the random coincidental appearance of a 27-bit word in the transmitted data that is not the synchronization word. Obviously, the longer the synchronization word is, the greater the chance of an error in the transmission causing the receiver to miss synchronization on the first occurrence of the synchronization word. Alternatively, the shorter the fixed synchronization word is, the greater is the likelihood of finding the same 27 bits occurring randomly in the data. With a synchronization word length of 27 bits, and an assumed error rate of one wrong bit in one million bits, the chance of missing the first occurrence of the synchronization word is about 1 in 37,000 (27 divided by 106). The chance of finding the synchronization word spuriously occurring in the transmitted data is 0.5 raised to the 27th power times 4,064, which is equal to 1 chance in 33,000. Consequently, the chance of missing synchronization and the chance of false synchronization are approximately equal in magnitude, thereby indicating the optimum selection of number of bits for the fixed synchronization word.

Another consideration in selecting the organization of the ROM 18 is the relationship between the frequency of the system clock and the frequency of the fast transmission clock. The fast clock provides additional space in the scrambled data stream for the overhead information. In that regard, where 4,096 bits must be transmitted for each 4,064 bits of data, the system clock must be speeded up in a ratio of 4,096/4,064. When reduced to the lowest common denominator, the ratio is then 128/127. It is important that the ratio of the total bits transmitted to the data bits transmitted by reduced to a common denominator of less than about 200, in the case 128. As a result, for low data rates of 56 kilobits per second, the lowest frequency experienced in the phase lock loop of the clock multiplier and clock recovery circuits is 437.5 hz. (56 kilobits per second divided by 128). If the ratio of overhead to total data did not reduce to a common denominator lower than 200, the frequencies in the phase lock loops would become so low that design of the circuitry would be more difficult.

A final consideration in the selection and organization of the pseudo-random sequence in the ROM, is the total length, i.e. the time between repeats. The length must be selected so that the repetition of the pseudo-random sequence does not produce significant descrete power spectral line components in the modulated RF spectrum used for transmission.

I claim:

1. A signal scrambling transmission system for transmitting and receiving data comprising:
   a. a transmitter comprising:
      i. data holding means having a data holding input for accepting data and a data holding output;
      ii. a clock multiplier having a multiplier clock input and a multiplier clock output wherein a system clock signal is received on the multiplier clock input and a second clock signal wherein the second clock signal has a higher frequency than the system clock signal, is generated at the multiplier clock output, and the system clock signal clocks the data into the data holding means and the second clock signal is used to clock the data out at a faster rate;
      iii. an addressable transmitter memory having a transmitter memory address input and a transmitter memory sequence output wherein the transmitter memory is divided into a number of frames each having a frame length which includes a known synchronization word having a synchronization word length, a frame index word for identifying the frames and having an index word length, and a pseudo random sequence of bits having a pseudo random sequence length wherein the sum of the synchronization word length and the index word length is less than two percent of the frame length;
      iv. a transmitter address counter having a transmitter counter input connected to the multiplier clock output for receiving the second clock signal and generating an address on an address output including the index word wherein the address is connected to the transmitter memory via its address input for identifying the location of the pseudo random sequence that is being output on the sequence output of the transmitter memory; and
      v. logic scrambler means connected to the sequence output of the transmitter memory and to the data holding output for logically combining the data, the pseudo random sequence, the synchronization word, and the index word in timed relationship to produce scrambled data at a scrambled data output;
   b. a transmission medium connected to the scrambled data output for conveying the scrambled data to a remote location;
   c. a receiver comprising;
      i. scrambled data holding means having a scrambled data holding input connected to the transmission medium for receiving a scrambled data and a scrambled data holding output;
      ii. clock recovery means connected via a recovery clock input to the transmission medium for recovering the second clock signal and generating the system clock signal on a recovery clock output therefrom wherein the second clock signal is used to clock the scrambled data into the scrambled data holding means;
      iii. detection means connected to the scrambled data holding output for detecting the synchronization word and the index word in the scrambled data and producing a synchronization signal on a first detector output upon detection of the synchronization word and outputting the index word corresponding to the detected synchronization word on a second detector output;
      iv. an addressable receiver memory having a receiver memory address input and a receiver memory sequence output, wherein the receiver memory is divided into the same number of frames as the transmitter memory and each frame includes the same pseudo random sequence of bits as the transmitter memory;
      v. a receiver address counter having a receiver counter input connected to the recovery clock input for receiving the fast clock signal, to the first detector output for receiving the synchronization signal, and to the second detector output for receiving the index word and producing an address count including the index word and having a receiver counter output connected to the receiver memory address input for identifying the location of the pseudo random sequence that is being output on the receiver memory sequence output; and
      vi. logic descrambler means connected to the sequence output of the receiver memory and the scrambled data holding output for combining the pseudo random sequence with the scrambled data to recover the data.

2. The signal scrambling transmission system of claim 1, wherein the frame length, the synchronization word length, and the index word length in the transmitter memory is selected so that for a predetermined maximum transmission error rate the probability of synchronization word detection means missing the synchronization word is approximately equal in magnitude to the probability of the synchronization word detection means detecting a randomly occurring synchronization word in the pseudo random sequence.

3. The signal scrambling transmission system of claim 1, wherein the number of frames in the pseudo random sequence in the transmitter memory is selected so that for a predetermined minimum transmission rate, the synchronization signal will occur within a predetermined time after receipt of scrambled data by the receiver.

4. The signal scrambling transmission system of claim 1, wherein the clock multiplier multiplies the system clock signal by a ratio of the frame length to the pseudo random sequence length, wherein the ratio when reduced to its lowest integer values has a numerator value that is less than 200.

5. The signal scrambling transmission system of claim 1, wherein the scrambled data is transmitted in BPSK mode by means of a BPSK modulator and the scrambled data is connected to the scrambled data holding means via a controllable phase inverter, wherein the synchronization word and index word produces the synchronization signal upon the detection of either the synchronization word or its complement, and wherein the detection means activates the phase inverter upon the detection of the synchronization word's complement.

6. The signal scrambling transmission system of claim 1, wherein the receiver further comprises a false frame detection means connected to the output of the synchronization word detection means which monitors the occurrence of the synchronization signal for each frame and upon the absence of the occurrence of the synchronization signal for a predetermined number of frames resets the address counter upon the detection by the detection means of the next synchronization word.

7. The signal scrambling transmission system of claim 1, wherein the frame length is 4096 bits, the synchronization word length is 27 bits, the index word length is 5 bits, and the number of frames is 32.

* * * * *